June 17, 1952  S. A. SHAPIRO  2,600,435
FREON 12 DEHYDRATOR AND MANIFOLD
Filed Nov. 29, 1948  2 SHEETS—SHEET 1

INVENTOR.
SAMUEL A. SHAPIRO
BY
*M.C.Hayes*
ATTORNEY

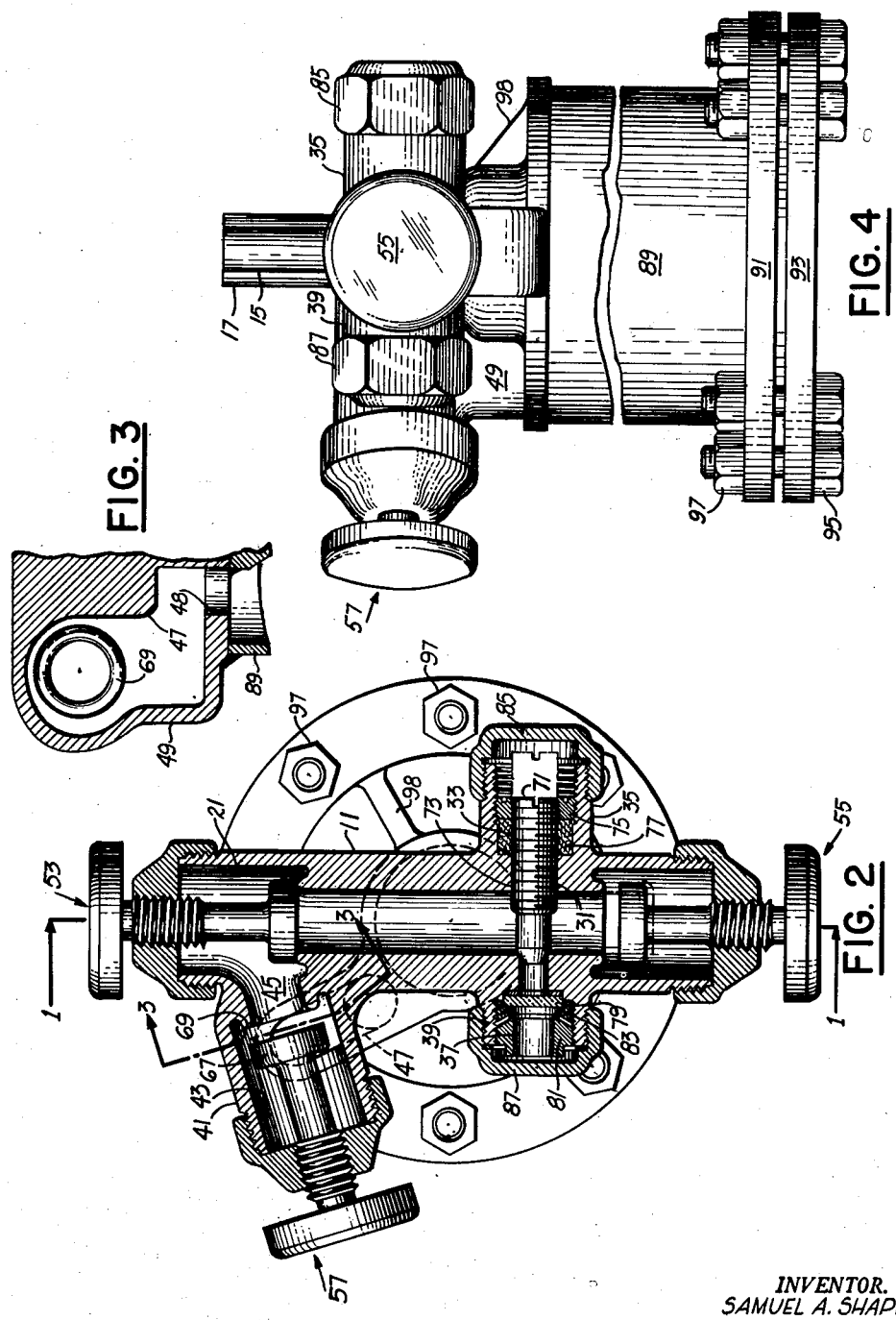

Patented June 17, 1952

2,600,435

UNITED STATES PATENT OFFICE 2,600,435

FREON 12 DEHYDRATOR AND MANIFOLD

Samuel A. Shapiro, Bronx, N. Y.

Application November 29, 1948, Serial No. 62,501

4 Claims. (Cl. 210—131)

(Granted under the act of March 3, 1883, as amended April 30, 1928; 370 O. G. 757)

This invention relates to improvements in refrigeration apparatus, and more particularly pertains to improvements in the dehydration system of refrigeration apparatus.

This application is a continuation in part of a now abandoned application, Ser. No. 623,161, filed October 18, 1945, by applicant for improvements in Freon 12 Dehydrator and Manifold.

The removal of accumulated moisture from a refrigerant such as Freon 12 employed in a refrigerating system is accomplished conventionally by dehydration, the refrigerant being passed through a chamber wherein dehydration is effected. To accomplish this under proper control conditions, it is necessary to provide inlet and outlet valves, a sight flow indicator, and a charging connection.

Conventionally, the valves, indicator and other elements are incorporated in the refrigerating system by means of pipes and fittings, with employment of a large number of silver-soldered connections to accomplish this purpose. As a result, controls are decentralized and each silver-soldered connection is a source of danger due to leakage, since such leakage is injurious to personnel and can disrupt operation of the entire refrigerating system. In installations presenting vibration problems, where limited space is available for the valves, pipes and fittings required, and where accessibility for purposes of maintenance and repair is a factor, as for example in installations on ships, the size and complexity of the apparatus is a serious disadvantage. Loosening of the silver-soldered joints occurs frequently. The original installation and routine maintenance are costly. In addition, skilled mechanics must be kept available to supervise maintenance of the system.

The subject device provides a compact manifold and dehydrating system that obviates the difficulties and disadvantages of the prior art. A unitary structure incorporates all the valves, conduits and controls required, provides an associated dehydration chamber, and includes means whereby the dehydration device can be removed from its shell and repaired or replaced without interrupting operation of the refrigerating system.

The primary object of the invention is to provide a compact manifold of unitary structure that is provided with all of the valves, indicators, connections and dehydrating devices necessary to control the flow of refrigerant, and is also provided with means to by-pass the refrigerant around said dehydrating devices.

Another object is to provide a compact control mechanism that can be installed facilely and quickly and that can be maintained and repaired readily by reason of its simplicity and accessibility.

A further object is to provide a compact control mechanism including a dehydrating device that can be maintained and repaired readily by reason of its simplicity, accessibility, and removability from an operating refrigeration system.

Still another object is to provide a dehydrating system for refrigeration apparatus in which system there is a minimum number of silver-soldered connections.

Another object is to provide a manifold of the character described that can be manufactured easily and that is of strong and durable construction.

Other objects and many of the attendant advantages of this invention will be readily appreciated as the same becomes better understood by reference to the following detailed description when considered in connection with the accompanying drawings wherein:

Fig. 2 is a horizontal section taken on the line 2—2 of Fig. 1;

Fig. 3 is a vertical section taken on the line 3—3 of Fig. 2;

Fig. 4 is an end elevation thereof;

Similar numerals refer to similar parts throughout the several views.

Figure 5:
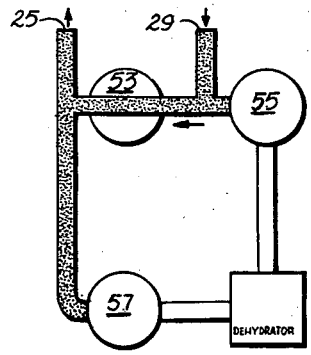
Fig. 5 is a schematic representation of the device showing by-pass operation thereof.

The manifold body 11, which is made preferably of forged or cast brass, comprises a block having a first cylindrical boss 13 extending above said block proximate one end thereof, a second cylindrical boss 15 extending above said block proximate the other end thereof, and a third cylindrical boss 17 extending above said block between said bosses 13 and 15. Bore 19 extends transversely and horizontally through body 11 and communicates with valve chamber 21, which extends into body 11 from the end thereof proximate boss 13, and with valve chamber 23, which extends into body 11 from the end thereof proximate boss 15.

Bore 25 is an outlet port that extends through boss 13 and communicates with valve chamber 21. Bore 27 is a charging connection that extends through boss 15 and communicates with valve chamber 23. Bore 29 is an inlet port that extends through boss 17 and communicates with bore 19. Bore 31 extends through body 11 horizontally and normally to bore 19, the axes of bores 19 and 31 intersecting. Said bore 31 communicates at one end with the sight-flow-indicator chamber 33 carried by boss 35 of body 11, and communicates at the opposite end with the sight-flow-indicator chamber 37 carried by boss 39 of body 11 (see Fig. 2). Said chambers 33 and 37, and the indicator thereof, are hereinafter described.

Boss 41 extends horizontally from body 11 and is provided with valve chamber 43, which communicates with valve chamber 21 through passage 45. Passage 47 (see Figs. 2 and 3) extends through boss 49 of body 11 and communicates at one end with valve chamber 43 and at the other end communicates through bore 48 with the face of body 11 that is distal boss 17. In addition, passage 51 extends through body 11 and communicates at one end with valve chamber 23 and at the other end with the face of body 11 that is distal boss 17.

Commercial, standard type, packless - valve assemblies 53, 55 and 57 are provided. Valve assembly 53 is mounted on body 11 at the portion thereof carrying valve chamber 21 so that valve disc 59 thereof is adapted to abut valve seat 61 to seal valve chamber 21 from bore 19. Valve assembly 55 is mounted on body 11 at the portion thereof carrying valve chamber 23 so that valve disc 63 thereof is adapted to abut valve seat 65 to seal valve chamber 23 from bore 19. Valve assembly 57 is mounted on boss 41, upon valve chamber 43, so that valve disc 67 thereof is adapted to abut valve seat 69 to seal valve chamber 43 from passage 45 and valve chamber 21.

The sight-flow indicator carried in bosses 35 and 39 of body 11 permits observation of the flow of refrigerant when desired. Said indicator comprises a cutout valve stem 71 that is normally in open position, as shown in broken lines in Fig. 2. Said stem 71 is threaded through the body of the manifold in threaded bore 73. Boss 35 is threaded interiorly to receive packing nut 75, which functions with packing 77 to prevent the refrigerant from leaking around the cutout valve stem 71. Diametrically opposite said packing nut 75 and packing 77, the sight-flow indicator is provided with a glass disc 79. The disc 79 is secured in place by retaining nut 81 and packing 83.

When it is desired to observe the flow of the refrigerant, seal cap 87 is removed from boss 39 and the flow of refrigerant can then be observed through the glass disc 79. To replace glass disc 79, valve stem 71 is advanced to the closed position shown in Fig. 2 and access to said glass is obtained by removing seal cap 87.

The cylindrical dehydrator shell 89 is brazed to the nether face of manifold body 11. Flange ring 91 is secured to said shell 89, and flange cover plate 93 fastened removably to said ring 91 by means of a plurality of bolts 95 and nuts 97. Gasket 99, positioned between ring 91 and plate 93, provides a suitable seal. Reinforcing webs 98 are also provided.

Seat fitting 101 is secured in the nether face of manifold body 11 at the end of passage 51. Said seat fitting 101 is hollow and depends from said body 11 for a distance into shell 89. Dispersion tube 103 is secured interior dehydrant cartridge 105, said cartridge having an end cup 107 whereby abutment with seat fitting 101 is maintained. A felt pad 109 and screen discs 111 and 113 are seated on the floor of said cartridge, and spring clip 115, which is fastened on cartridge 105, bears against flange cover plate 93 to retain said cartridge and dispersion tube against seat fitting 101.

A multiplicity of perforations 117 are provided in the wall of dispersion tube 103, and a multiplicity of perforations 119 are provided in the wall of dehydrant cartridge 105. A suitable dehydrant, such as silica gel 121, is carried in said cartridge.

In operation, the refrigerant enters the manifold through bore 29. Valve 59 is seated on valve seat 61, valve 63 is in open position, and bore 27 is closed by suitable means not shown. Accordingly, the refrigerant passes through bore 29, thence through bore 19, passage 51 and seat fitting 101 into dispersion tube 103. The refrigerant then passes through perforations 117 and through the silica gel 121, where dehydration is effected, and exists through perforations 119. Valve 57 being in open position, the dehydrated refrigerant then passes between the cartridge 105 and shell 89, through passage 47 and valve chamber 21, and thence through bore 25 and back into the refrigerating system.

When it is desired to by-pass the dehydrator, as for example when it is necessary to remove the dehydrator for repair, replacement or for re-activation of the dehydrant, valve assembly 55 is closed so that valve disc 63 is seated against valve seat 65, valve assembly 57 is closed so that valve disc 67 is seated against valve seat 69, and valve assembly 53 is in open position. Accordingly, the refrigerant passes through bore 29, then through bore 19 into valve chamber 21 and thence through bore 25 and back into the refrigerating system.

Figure 6:
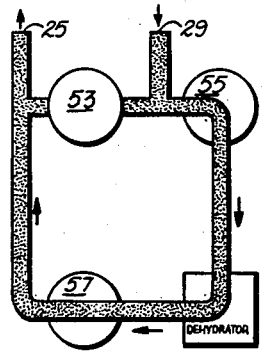
Fig. 6 is a schematic representation of the device showing normal operation thereof.
Figure 1:
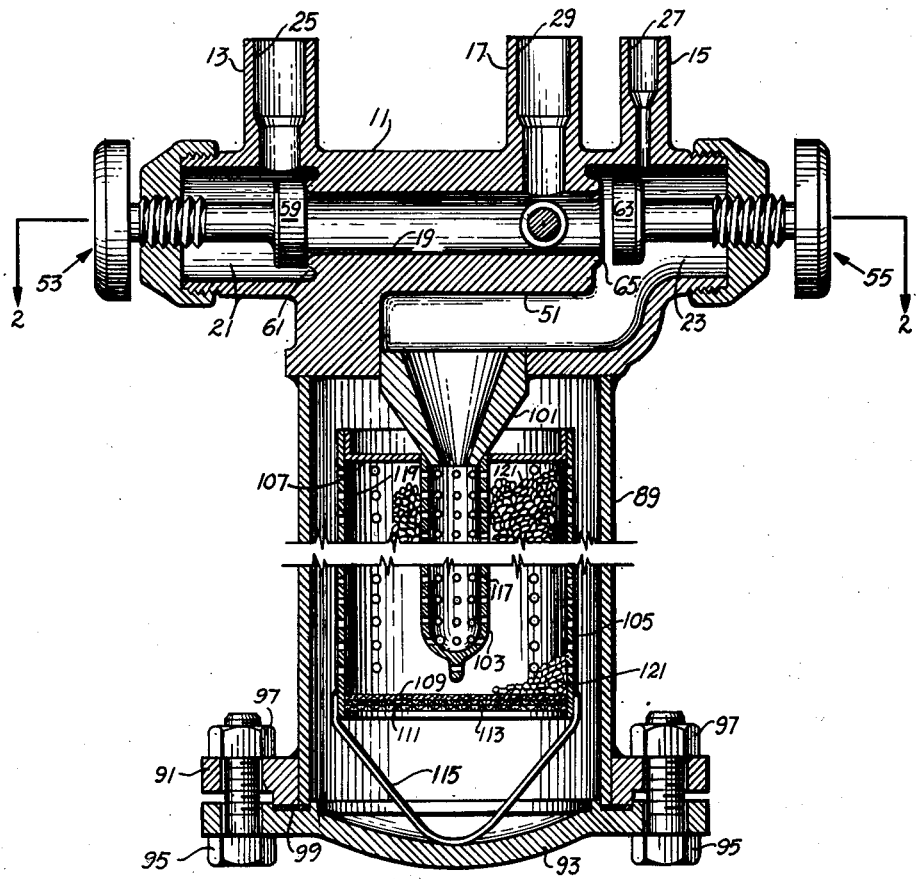
Fig. 1 is a sectional elevation of a dehydration system for refrigeration apparatus, taken on the line 1—1 of Fig. 2, showing a preferred embodiment of the invention.

The flow hereinabove described is shown graphically in Figs. 5 and 6. When by-pass of the refrigerant is desired, valve assemblies 55 and 57 are in closed position and valve assembly 53 is in open position. As a result, flow occurs into inlet bore 29, through valve assembly 53, and back into the refrigerating system through bore 25, the stippled portion of Fig. 5 indicating the path of flow. When dehydration is desired, valve assembly 53 is in closed position and valve assemblies 55 and 57 are in open position. As a result, flow occurs into inlet bore 29, through valve assembly 55, thence through the dehydrator, thence through valve assembly 57 and back into the refrigerating system through bore 25, the stippled portion of Fig. 6 indicating the path of flow.

Boss 15 serves as a charging connection. Refrigerant can be fed into the system through bore 27 initially or when it is desired to replenish leakage losses. The latter can be done without disrupting operation of the system.

It is thus apparent that the subject device improves significantly over dehydrator systems heretofore employed. The manifold structure reduces the number and complexity of pipes, fittings and silver-soldered connections to a minimum, thereby presenting a compact installation that is accessible readily for maintenance and repair, and reducing vibration problems materially. Servicing can be accomplished by relatively unskilled personnel, in a minimum of time, without disrupting operation of the system.

Obviously many modifications and variations of the present invention are possible in the light of the above teachings. Therefore, within the scope of the appended claims the invention can be practiced otherwise than as specifically described.

The invention described herein may be manufactured and used by or for the Government of the United States of America for governmental purposes without the payment of any royalties thereon or therefor.

I claim:

1. A refrigerant dehydrating system comprising a manifold block, a dehydrating chamber attached rigidly to said block, inlet, outlet and charging ports in said block, a first passage in said block connecting said ports, a second passage in said block connecting said inlet port and said chamber, inlet valve means to regulate the flow of refrigerant to said chamber, a resiliently mounted dehydrating cartridge provided with perforated side walls positioned in said chamber to receive refrigerant from said inlet port, a drying agent in said cartridge, a third passage in said block connecting said chamber and the outlet port and adapted to conduct dried refrigerant thereto, outlet valve means to regulate the flow of refrigerant from said chamber to said outlet port, and by-pass valve means in said first passage that permits refrigerant to flow directly from the inlet port to the outlet port and thereby by-pass said chamber when said inlet and outlet valve means are closed.

2. A refrigerant dehydrating system comprising a manifold block, a first transverse passage in said block, an enlarged chamber in said block at each end of said passage, an inlet port in said block communicating with said passage, valve means to seal said passage from one of said chambers, a second passage in said block connecting said one of said chambers to a central point of discharge of the refrigerant in the bottom of said block, a discharge seat fitting secured rigidly to said block at said point, a dehydrating chamber attached rigidly to said block over said seat fitting, a removable cartridge provided with perforated side walls positioned within said chamber, a perforated dispersion tube carried in said cartridge and bearing against said seat fitting, a drying agent carried in said cartridge around said tube, a cover plate attached removably to said chamber, spring means to retain said tube and cartridge bearing against said seat fitting, an outlet port in said block communicating with the other of said enlarged chambers, a third chamber in said block, a passage connecting said other of said chambers and said third chamber, valve means to seal said passage, a passage in said block connecting said dehydrating chamber and said third chamber, and valve means to seal said first transverse passage from said other of said enlarged chambers.

3. A refrigerant dehydrating system comprising a manifold block, a dehydrating chamber attached rigidly to said block, inlet, outlet and charging ports in said block, a first passage in said block connecting said ports, inlet valve means to regulate the flow of refrigerant to said chamber, a second passage in said block connecting said inlet port and said chamber, a resiliently mounted dehydrating cartridge provided with perforated side walls positioned in said chamber to receive refrigerant from said inlet port, a drying agent in said cartridge, outlet valve means in said block, a third passage in said block connecting said chamber and the outlet port and adapted to conduct dried refrigerant thereto, by-pass valve means in said first passage that permits refrigerant to flow directly from the inlet port to the outlet port and thereby by-pass said chamber when said inlet and outlet valve means are closed, and a sight flow indicator extending transversely through said first passage.

4. A refrigerant dehydrating system comprising a manifold block, a dehydrating chamber attached to said block, inlet, outlet and charging ports in said block, a first passage in said block connecting said ports, a second passage in said block connecting said inlet port and said chamber, inlet valve means to regulate the flow of refrigerant to said chamber, a dehydrating cartridge provided with perforated side walls and carrying a drying agent positioned in said chamber to receive refrigerant from said inlet port, a third passage in said block connecting said chamber and the outlet port and adapted to conduct dried refrigerant thereto, outlet valve means to regulate the flow of refrigerant from said chamber to said outlet port, and by-pass valve means in said first passage that permits refrigerant to flow directly from the inlet port to the outlet port and thereby by-pass said chamber when said inlet and outlet valve means are closed.

SAMUEL A. SHAPIRO.

REFERENCES CITED

The following references are of record in the file of this patent:

UNITED STATES PATENTS

| Number | Name | Date |
| --- | --- | --- |
| 502,583 | Rankine | Aug. 1, 1893 |
| 1,727,808 | Champion | Sept. 10, 1923 |
| 2,199,258 | Gray | Apr. 30, 1940 |
| 2,223,701 | Olson et al. | Dec. 3, 1940 |